(12) United States Patent
Szent-Miklosy

(10) Patent No.: US 11,358,303 B2
(45) Date of Patent: Jun. 14, 2022

(54) VOLCANIC MATERIAL AND METHOD FOR PRODUCING THE SAME

(71) Applicant: Balint Szent-Miklosy, New York, NY (US)

(72) Inventor: Balint Szent-Miklosy, New York, NY (US)

(*) Notice: Subject to any disclaimer, the term of this patent is extended or adjusted under 35 U.S.C. 154(b) by 27 days.

(21) Appl. No.: 16/453,660

(22) Filed: Jun. 26, 2019

(65) Prior Publication Data
US 2020/0406497 A1 Dec. 31, 2020

(51) Int. Cl.
*B28B 1/54* (2006.01)
*C04B 28/24* (2006.01)
*B28B 17/02* (2006.01)
*B28B 11/24* (2006.01)

(52) U.S. Cl.
CPC .............. *B28B 1/54* (2013.01); *B28B 11/246* (2013.01); *B28B 17/02* (2013.01); *C04B 28/24* (2013.01)

(58) Field of Classification Search
None
See application file for complete search history.

(56) References Cited

U.S. PATENT DOCUMENTS 6,551,541 B1 * 4/2003 Watson ..................... B28B 1/14
264/299

FOREIGN PATENT DOCUMENTS

KR 20040075836 A * 8/2004

OTHER PUBLICATIONS

Machine English translation of KR-20040075836-A, Accessed Jan. 3, 2022 (Year: 2004).*

* cited by examiner

*Primary Examiner* — Francisco W Tschen
*Assistant Examiner* — Adrianna N Konves

(57) ABSTRACT

A system and method for manufacturing building materials made of volcanic material includes gathering of molten volcanic material that is collected by catching the molten volcanic material after the molten volcanic material flows off an edge of land, cooling the volcanic material by immersing the mold containing the volcanic material into a body of ocean water, and shaping the volcanic material into shapes that may be used in construction.

5 Claims, 2 Drawing Sheets

VOLCANIC MATERIAL AND METHOD FOR PRODUCING THE SAME

TECHNICAL FIELD

The present disclosure is directed to a system and method for manufacturing building materials made of volcanic material. In particular, the present disclosure is directed to the gathering of molten volcanic material, cooling the volcanic material, and shaping the volcanic material into shapes that may be used in construction.

BACKGROUND

There exist a number of processes for developing various types of raw materials into processed materials that may be used in the construction of buildings and other similar structures. Common building materials include wood or lumber, metal, concrete, adobe, tar, stucco, brick, and stone. The processes by which each of these building materials are produced inevitably produce a substantial negative effect on the environment.

The process of producing lumber begins cutting trees, typically in massive quantities. While the cutting of trees can be a relatively harmless activity if the trees had been specially planted for purposes of producing lumber and are subsequently replanted, cutting of trees often can result in deforestation or simply a reduction in the number of trees. A reduction of trees can have substantial consequences. The reduction can lead to an increase in erosion and flooding due to a decrease in support provided to the ground by living tree roots and a decrease in the impediment and absorption of water. Furthermore, trees perform photosynthesis to convert sunlight into usable energy and in the process absorb carbon dioxide and produce oxygen. Therefore, a reduction in trees reduces the removal of carbon dioxide, a greenhouse gas, from the atmosphere. Moreover, cutting trees is performed with pieces of industrial equipment that consume large amounts of energy and emit pollutants into the air. From there, the cut trees must be further processed into useable sizes and shapes using further pieces of industrial equipment that use energy and emit pollutants. Lastly, due to the characteristics of wood (e.g. susceptibility to insects, susceptibility to decomposition, inconsistent strength properties), there is often a need to treat wood. The chemicals used to treat the wood are often harmful in and of themselves to the environment, as are the processes used to develop such chemicals. Accordingly, while wood is a naturally occurring resource, its removal, processing, and treatment can lead to substantial negative effects on the environment.

As can be seen, there are a multitude of available raw materials that may be processed into building materials. However, obtaining and processing those raw materials can result in substantial pollution and energy waste. Therefore, there is a need for systems and methods for developing and manufacturing building materials that require less energy and generate less pollution.

SUMMARY

The present disclosure is directed to systems and methods of collecting lava from a lava stream from volcanoes and shaping, cooling, and generally processing the collected lava into materials suitable for construction of buildings and other such large projects.

As used herein, the term "lava" refers to any molten rock generated by geothermal energy and expelled through fractures in planetary crust. "Lava" shall also refer to "lava flow" and "molten volcanic material" as used herein. Lava flow "LF" from which lava "L" may be collected. Lava flow "LF" is a moving outpouring of lava "L" created during a non-explosive effusive eruption. While this application generally refers to "lava", a person having ordinary skill in the art would understand that similar systems and methods may be applied with respect to volcanic material or molten rock that is collected from within the Earth's core and that has not erupted to the surface in a naturally occurring manner.

A volcano is a rupture in the Earth's crust caused by the divergence or convergence of tectonic plates. As tectonic plates converge, one plate subducts beneath the other plate causing the crust above the plates to weaken. As tectonic plates diverge, the crust above the plates is pulled in opposite directions also creating a weakening in the crust along a line of divergence. In both situations, the weakening of the Earth's crust along tectonic plates creates an opportunity for a volcano to erupt.

Currently, there are approximately 1,500 potentially active volcanoes worldwide. The amount of lava produced by each varies significantly compared to one another and over time. However, some volcanoes, such as Hawaii's Kilauea which has produced, on average, between 358,000 and 717,000 square yards of lava per day, produce continual and consistent supplies of lava. The lava output from these volcanoes produces an opportunity for the lava to be harnessed while in molten and shapeable form. Thus, unlike metals (e.g. steel), there is no energy expended heating the material to be able to shape it. Moreover, because many active volcanoes readily spew volcanic material, there is no energy expended in mining or harvesting (as in the case of metals, rock, and lumber.) Furthermore, because volcanoes frequently occur in or near bodies of water, especially in or near the ocean in the case of a volcano developed by diverging tectonic plates, there is typically an available, nearby water supply which may be used to cool down the molten lava into solid rock. Thus, because the water supply is conveniently located, there is little to no energy required to ship or pump water long distances to cool the lava. Accordingly, there is an opportunity to harness the supply of lava to produce greener, more energy efficient and earth-friendly building materials.

In accordance with an aspect of the present disclosure, a method for manufacturing building materials is described. The method includes collecting molten volcanic material, directing the molten volcanic material into a mold, conveying the mold into a body of water, allowing the molten volcanic material within the mold to be cooled by the body of water to produce solid volcanic material, and removing the solid volcanic material from the mold.

In a further aspect herein, collecting the volcanic material includes scooping the molten volcanic material from a flow of molten volcanic material.

In yet another aspect, collecting the volcanic material includes receiving the molten volcanic material and directing the molten volcanic material into the mold.

In a further aspect, the molten volcanic material is collected by catching the molten volcanic material after the molten volcanic material flows off an edge of land.

In another aspect herein, directing the molten volcanic material into a mold includes situating the mold beneath the molten volcanic material and catching the molten volcanic material in the mold.

In another aspect of the present disclosure, conveying the mold into the body of water includes moving the mold along a conveyor belt.

In a further aspect herein, a weight of the molten lava is used to move the mold along the conveyor belt.

In accordance with another aspect of the present disclosure, the method further includes a system for manufacturing building materials. The system includes an output, one or more molds, and a conveyor. The output may be configured to allow molten volcanic material to flow into one or more molds. The one or more molds are configured to receive the molten volcanic material from the output. The conveyor is coupled to the one or more molds and configured to convey the one or more molds into a body of water to be cooled.

In another aspect, the system further includes a crane configured to use a bucket to scoop the molten volcanic material from a flow of molten volcanic material and deposit the molten volcanic material into one or more molds.

Further, to the extent consistent, any of the aspects described herein may be used in conjunction with any or all of the other aspects described herein.

BRIEF DESCRIPTION OF THE FIGURES

Objects and features of the presently disclosed system and method will become apparent to those of ordinary skill in the art when descriptions of various embodiments thereof are read with reference to the accompanying drawings, of which.

Figure 1:
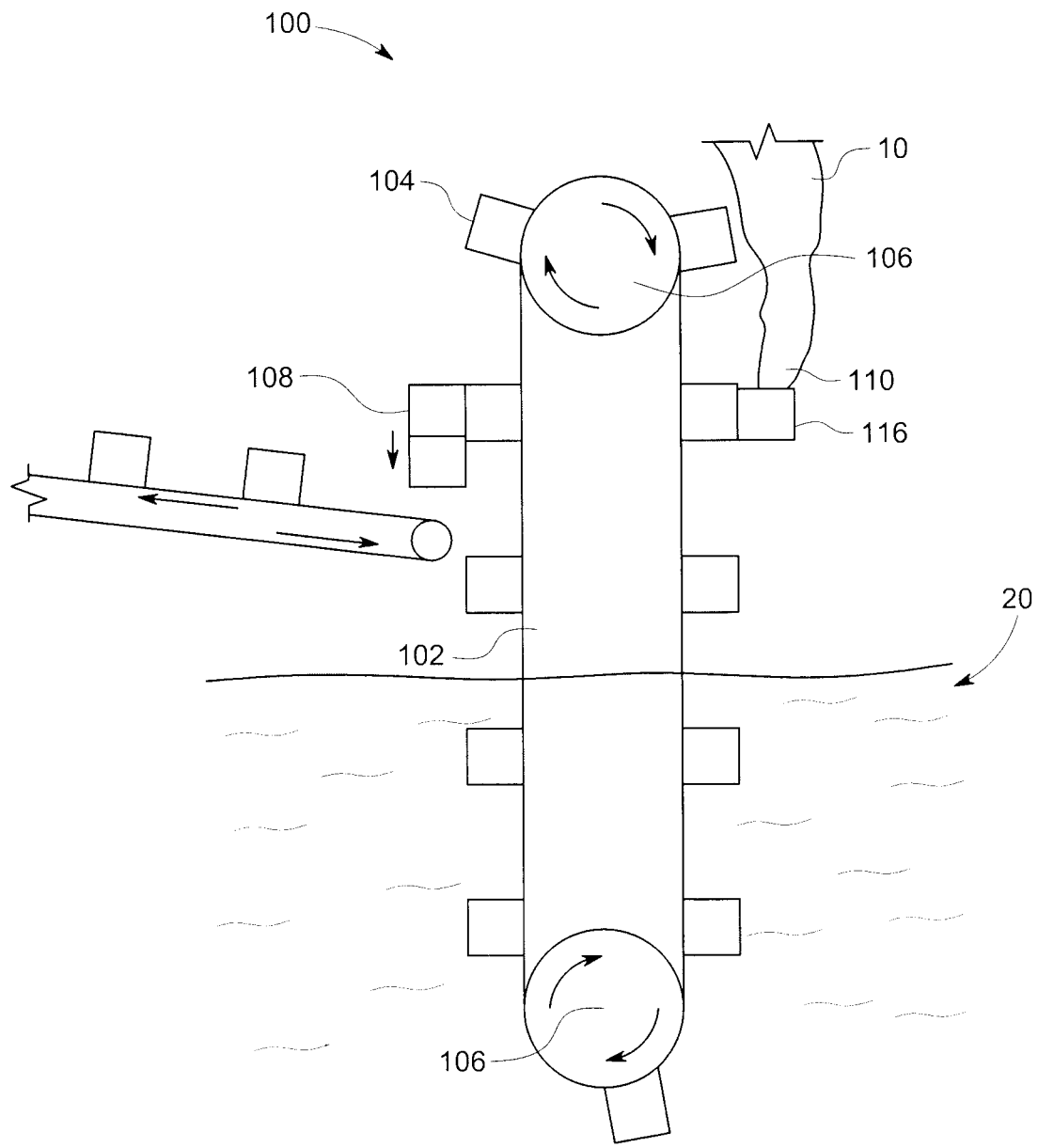
FIG. 1 is a schematic diagram of the system for manufacturing building materials, in accordance with an embodiment of the present disclosure.

Further details and aspects of exemplary embodiments of the disclosure are described in more detail below with reference to the appended figures. Any of the above aspects and embodiments of the disclosure may be combined without departing from the scope of the disclosure.

DETAILED DESCRIPTION

Exemplary embodiments of the present disclosure will be described more fully below (e.g., with reference to the accompanying drawings). Like reference numerals may refer to like elements throughout the specification and drawings.

Referring to FIG. 1, the system 100 for manufacturing building materials includes an output 110 being configured to allow the molten volcanic material 10 to flow into one or more molds 104. Additionally, the system 100 may include one or more molds 104 disposed on a conveyor belt 102 to receive the molten volcanic material 10 from the output 110. Further, the molten volcanic material in the mold 116 may be cooled by conveying the mold 104 into a body of water 20 by moving the mold 104 along a conveyor belt 102. A weight of the molten volcanic material may be disposed on the mold 104 to move said mold 104 along the conveyor belt 102. Lastly, cooling the molten volcanic material within the mold 116 in the body of water 20 to produce solid volcanic material 108, then removing the solid volcanic material 108 from the mold 104, allows the solid volcanic material 108 to be shaped by the molds 104 into formations that may include bricks, building blocks which may have a shape like a Lego, pillars and other similar structures.

According to an exemplary embodiment of the present disclosure, collecting the volcanic material 10 includes receiving the molten volcanic material 10. According to an exemplary embodiment of the present disclosure, the molten volcanic material 10 may be collected by catching the molten volcanic material 10 after the molten volcanic material 10 flows off an edge of land.

In various embodiments of the present disclosure, the system 100 may include a crane configured to use a bucket to scoop the molten volcanic material 10 from a flow of molten volcanic material 10 and deposit the molten volcanic material 10 into one or more molds 104.

In various embodiments of the present disclosure, the molten volcanic material 10 may be directed into a mold 104. Accordingly, the mold 104 may be situated beneath the molten volcanic material 10 and thereby catch the molten volcanic material 10 in the mold 104.

According to an exemplary embodiment of the present disclosure, the system 100 includes conveying the mold 104 into the body of water 20 by moving the mold 104 along a conveyor belt 102.

According to an exemplary embodiment of the present disclosure, the conveyor belt 102 may be driven by at least two sprocket wheels 106 in engagement therewith. The conveyor belt 102 may be driven by said sprocket wheels 106, being supported on a stationary frame, in a substantially continuous fashion along a closed loop path. The stationary frame has at least two spaced axles supported thereon, said axles carrying at least one sprocket wheel 106 for rotation relative to said frame, linked together to form an endless conveyor belt 102, said conveyor belt 102 being engaged by at least two sprocket wheels 106.

In various embodiments of the present disclosure, at least one of the sprocket wheels 106 may be positioned above the body of water 20. At least one sprocket wheel 106 may be positioned below the body of water 20.

According to an exemplary embodiment of the present disclosure, a weight of the molten volcanic material may be used to move the mold 104 along the conveyor belt 102.

According to an exemplary embodiment of the present disclosure, a conveyor 102 may be coupled to the one or more molds 104 and configured to convey the one or more molds 104 into a body of water 20 to be cooled. Cooling the one or more molds 104 produces solid volcanic material 108.

In various embodiments of the present disclosure, solid volcanic material 108 may be removed from the one or more molds 104. The solid volcanic material 108 may be shaped by the molds 104 into formations that may be used, for example, in construction. Desirable formations may include bricks, building blocks which may have a shape like a Lego, pillars and other similar structures.

Figure 2:
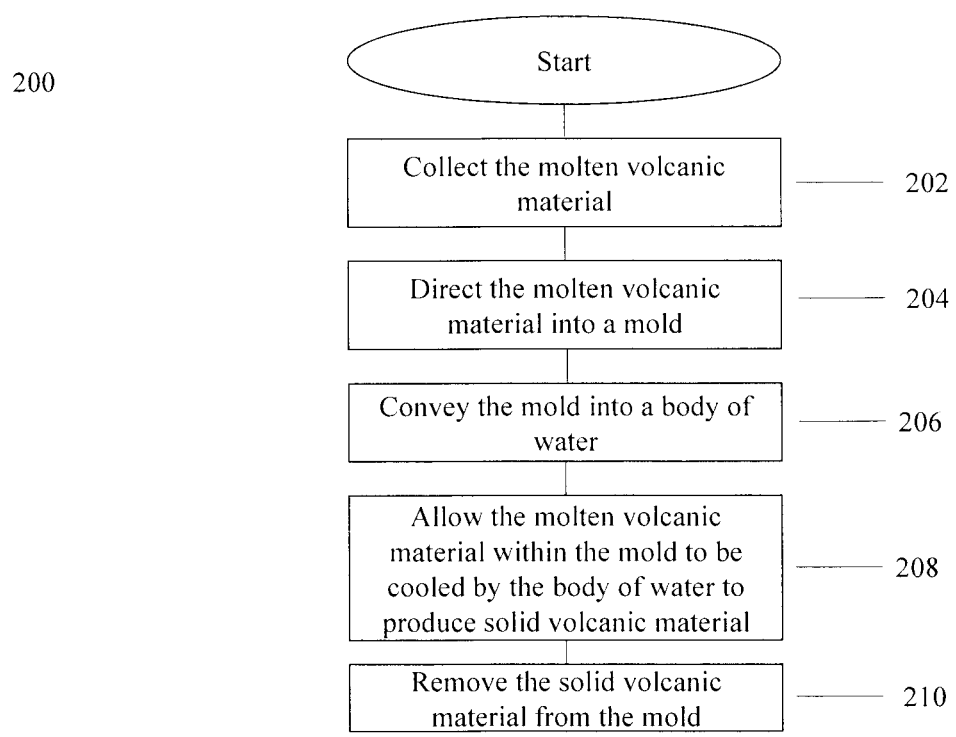
FIG. 2 is a block diagram of the method for manufacturing building materials, in accordance with an embodiment of the present disclosure.

With reference to FIG. 2, there is shown a method 200 of manufacturing building materials. In various embodiments, the method of FIG. 2 can be performed by the system 100 of manufacturing building materials. The following description will refer to the system 100, but it will be understood that such description is exemplary and does not limit the scope and applicability of the present disclosure.

Initially, at step 202, the system 100 collects the molten volcanic material 10. Collecting the volcanic material 10 includes catching the molten volcanic material 10 after the molten volcanic material 10 flows off an edge of land. Additionally, collecting the volcanic material 10 may include scooping the molten volcanic material 10 from a flow of molten volcanic material 10.

Further, at step 202, the system 100 may include a crane configured to use a bucket to scoop the molten volcanic material 10 from a flow of molten volcanic material 10 and deposit the molten volcanic material 10 into one or more molds 104.

Next, at step 204, the system 100 may direct the molten volcanic material 10 into a mold 104. Further, the system 100 may direct the molten volcanic material 10 into the mold 104. Accordingly, the mold 104 may be situated beneath the molten volcanic material 10 and thereby catch the molten volcanic material 10 in the mold 104.

In step 206, the system 100 may include conveying the mold 104 into a body of water 20 by moving the mold 104 along a conveyor belt 102. A weight of the molten volcanic material may be used to move the mold 104 along the conveyor belt 102. The conveyor belt 102 may be driven by at least two sprocket wheels 106 in engagement therewith. The conveyor belt 102 may be driven by said sprocket wheels 106, being supported on a stationary frame, in a substantially continuous fashion along a closed loop path. The stationary frame has at least two spaced axles supported thereon, said axles carrying at least one sprocket wheel 106 for rotation relative to said frame, linked together to form an endless conveyor belt 102, said conveyor belt 102 being engaged by at least two sprocket wheels 106. Accordingly, at least one of the sprocket wheels 106 may be positioned above the body of water 20. At least one sprocket wheel 106 may be positioned below the body of water 20.

At step 208, the system 100 may allow molten volcanic material within the mold 116 to be cooled by the body of water 20 to produce solid volcanic material 108.

At step 210, the system 100 may remove the solid volcanic material 108 that may be shaped by the mold 104, from said mold 104 shaped into formations that may be used, for example, in construction. Desirable formations may include bricks, building blocks which may have a shape like a Lego, pillars and other similar structures.

Although embodiments have been described in detail with reference to the accompanying drawings for the purpose of illustration and description, it is to be understood that the inventive processes and apparatus are not to be construed as limited thereby. It will be apparent to those of ordinary skill in the art that various modifications to the foregoing embodiments may be made without departing from the scope of the disclosure as set forth in the following claims.

The invention claimed is:

1. A method of manufacturing building materials, the method comprising:
    collecting molten volcanic material, wherein the molten volcanic material is collected by catching the molten volcanic material after the molten volcanic material flows off an edge of land;
    directing the molten volcanic material into a mold;
    conveying the mold into a body of ocean water;
    immersing the mold containing the volcanic material into the body of ocean water;
    allowing the molten volcanic material within the mold to be cooled by the body of ocean water to produce solid volcanic material; and
    removing the solid volcanic material from the mold.

2. The method of claim 1, wherein collecting the volcanic material includes:
    scooping the molten volcanic material from a flow of molten volcanic material.

3. The method of claim 1, wherein directing the molten volcanic material into a mold includes situating the mold beneath the molten volcanic material and catching the molten volcanic material in the mold.

4. The method of claim 1, conveying the mold into the body of water includes moving the mold along a conveyor belt.

5. The method of claim 4, wherein a weight of the molten volcanic material is used to move the mold along the conveyor belt.

* * * * *